United States Patent [19]

Baxter et al.

[11] 4,229,858
[45] Oct. 28, 1980

[54] BOAT-MOUNTABLE FISH-CLEANING TRAY

[76] Inventors: Stephen M. Baxter, P.O. Box 3995, Sarasota, Fla. 33578; M. David Baxter, 9 Northwood Dr.; James D. Eadline, P.O. Box 310, both of Vineland, N.J. 08360

[21] Appl. No.: 956,687

[22] Filed: Nov. 1, 1978

[51] Int. Cl.³ .......................................... A22C 25/06
[52] U.S. Cl. ............................................ 17/44; 17/53
[58] Field of Search .................. 17/53, 44, 66; 43/55; 269/289 R, 302.1; 211/132, 133, 134

[56] References Cited

U.S. PATENT DOCUMENTS

| 205,128 | 6/1878 | Ortlip | 17/44 X |
| 1,693,761 | 12/1928 | Macripo | 17/44 X |
| 2,119,640 | 6/1938 | Lundell | 17/44 |
| 3,307,253 | 3/1967 | Wullenwaber | 269/289 X |
| 3,668,739 | 6/1972 | Lewis | 17/53 |
| 3,908,231 | 9/1975 | Price et al. | 269/289 X |

Primary Examiner—Willie G. Abercrombie

[57] ABSTRACT

A boat-mountable fish-cleaning tray with sides and a drainage opening, during use the drainage opening being suspended away from the boat and over the water. A cutting board is attached to the tray. The tray is releasably mounted on legs which in turn are releasably mounted on a boat's afterdeck, gunwale, or cockpit floor.

2 Claims, 6 Drawing Figures

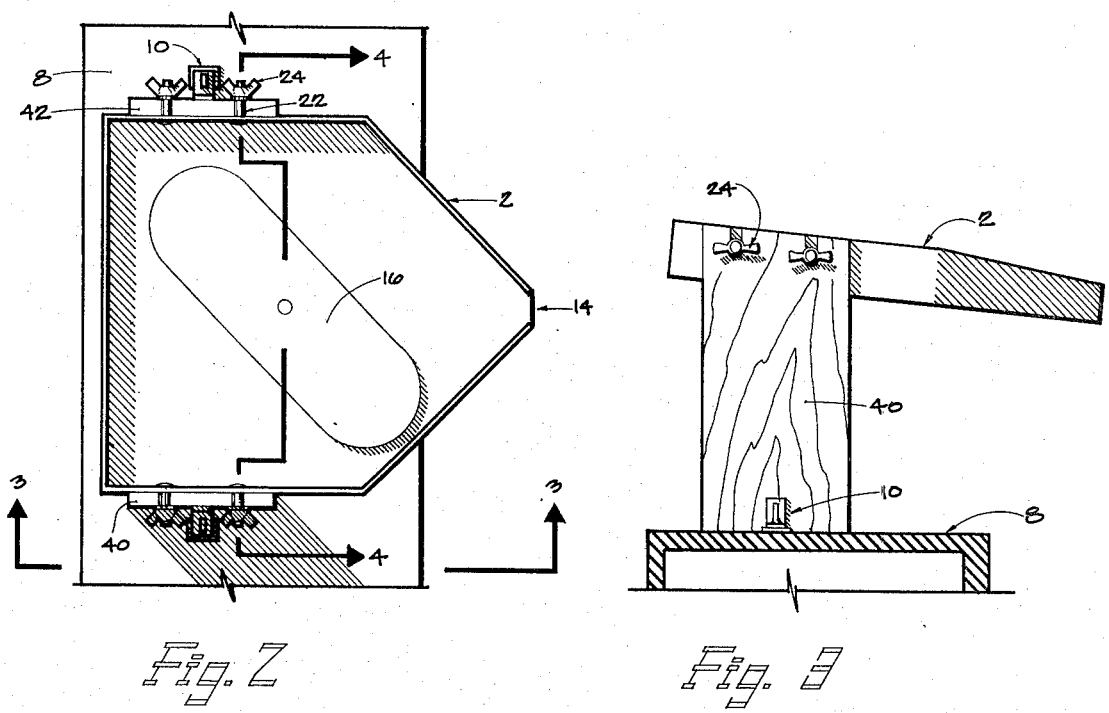
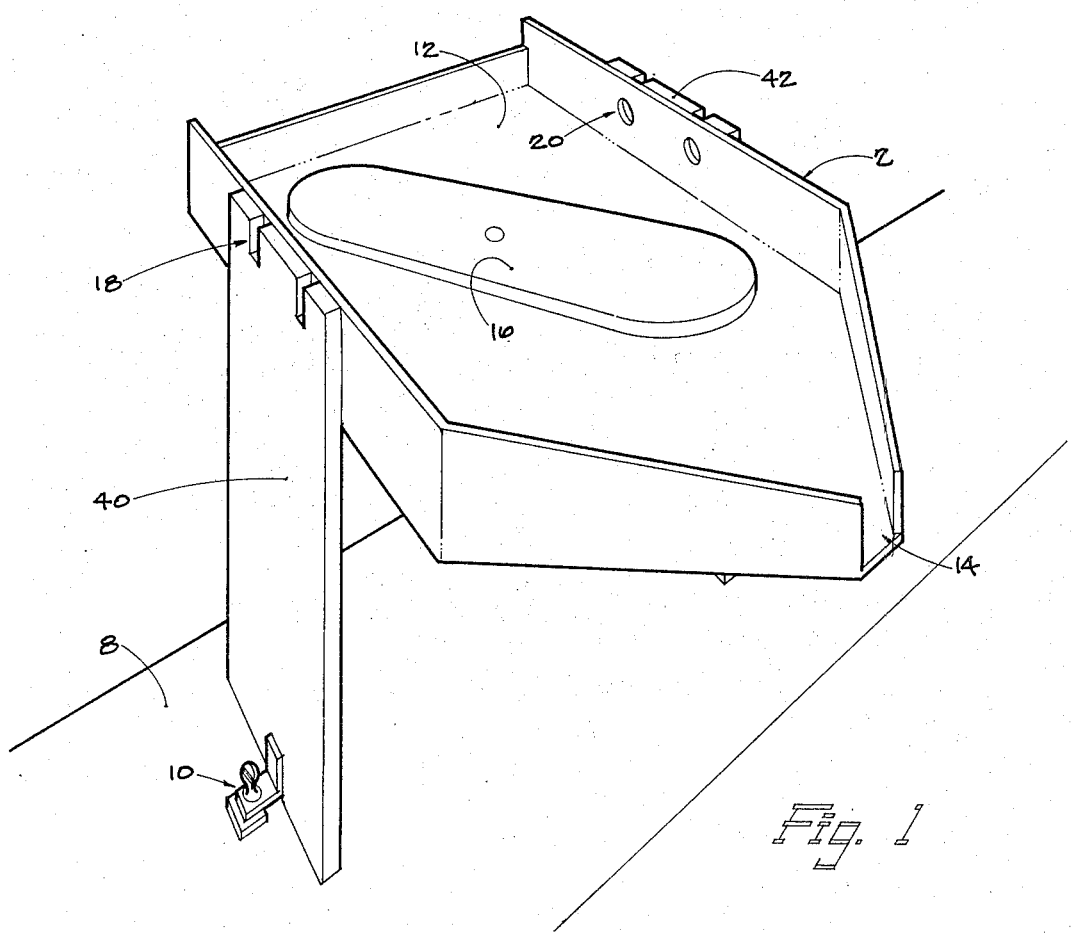

BOAT-MOUNTABLE FISH-CLEANING TRAY

BACKGROUND OF THE INVENTION

This invention relates generally to boat attachments, and more particularly to a boat-mountable tray on which fish can be cleaned, bait cut, etc., which has a cutting board, which is detachable from the boat, and which drains over the side or stem of the boat.

Disposal of the unused parts of fish that fishermen catch is a major problem for marinas and for areas where boats congregate generally, as well as for the fishermen themselves, especially those who live a good distance from their boats and those who trail their boats behind their cars. The logical place to dispose of fish waste is the open fishing grounds, where the waste will disperse and become food for other marine life.

Most boats used by sportfishermen have no facilities for cleaning fish, and boat owners have traditionally been reluctant to improvise, since the quantities of wood-staining, insect-attracting, and foul-smelling fluids and other refuse involved can be considerable, and the effects can linger.

The afterdecks and gunwales of sportfishing boats are often not flat, and therefore cannot properly accommodate an ordinary tray set thereon. Even when said surfaces are flat they are seldom of the proper working height. In any case, an ordinary tray would provide no drainage capacity. Trays specially designed to fit into existing marine hardware (such as fishing rod holders) on fishing boats are of very limited application, due to the lack of standardization of design, size, orientation, etc., among such hardware.

The present invention is directed to a solution to the above problems and additional problems as will appear.

It is a general object of the invention to provide a fish-cleaning tray which can be mounted on the variously shaped afterdecks, gunwales, and other boat surfaces, and so that an opening in the tray can be suspended out over the water for drainage, in order that the boat not be soiled.

Another object of this invention is to provide a cutting board on said tray, since many of the best materials for tray construction (such as molded plastic, stainless steel, etc.) are not good cutting surfaces.

Another object of this invention is to provide a fish-cleaning tray the components of which can be readily disassembled for easy cleaning and storage.

Additional objects and advantages of the invention will appear from the detailed description thereof and from the drawings.

SUMMARY OF THE INVENTION

The present invention is a tray with sides, a slanted bottom, and an opening or hole for drainage. The bottom is tilted toward the opening in order that the blood and other waste fluids drain through the opening, which is suspended over the water. The tray sides are necessary to prevent such fluids, scales, entrails, and other fish waste from soiling the boat.

The tray accommodates a cutting board which is attached to the tray bottom. The cutting board can be rotatably attached in order to allow the fish cleaner to change board positions as necessary, and so that both left- and right-handed fish cleaners can be accommodated.

The tray is held in position by legs which are detachable from both the tray and the boat. Because during fishing or docking operations the tray could get in the way of boaters, it must be demountable. In addition, the disassembled components can be more easily stored in less space on a boat than if otherwise permanently assembled. The legs should be of wood or other material which is equally shapeable so that they can be cut to the proper length and shaped to fit the contours of the boat surface where they are attached thereto. The invention can therefore be adapted to a wide variety of boat models, sizes and styles.

The foregoing as well as other advantages of the invention will appear from the following description and drawings.

BRIEF DESCRIPTION OF THE DRAWINGS

FIG. 1 is a view in perspective illustrating a boat-mountable fish-cleaning tray accommodating a cutting board and supported by detachable legs in accordance with the invention.

FIG. 2 is a top plan view of the fish-cleaning tray in FIG. 1.

FIG. 3 is a side view corresponding to line 3—3 of FIG. 2.

DESCRIPTION OF PREFERRED EMBODIMENTS

Figure 4:
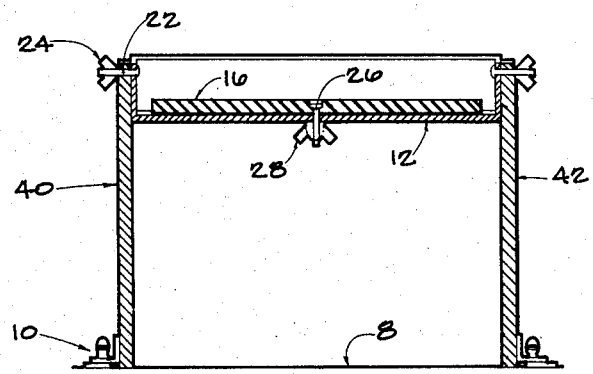
FIG. 4 is a view in horizontal section taken along line 4—4 in FIG. 2.

In the drawings, the tray 2 as shown is five-sided, although this shape may be varied. The legs 40 and 42 reach from the tray sides to the boat afterdeck or gunwale 8, where they are attached with thumbscrew fittings 10. The tray bottom 12 is tilted toward the opening 14 in the tray just steeply enough to provide proper drainage of fish waste fluids and of water when the tray is flushed clean. On top of the tray bottom 12 the cutting board 16 is attached.

As shown in FIG. 1, the legs 40 and 42 have slots 18 at their tops which correspond to holes 20 in the tray. The hand-tightenable and -loosenable fasteners which fit through the slots 18 and into the holes 20 to attach the tray 2 to the legs 40 and 42 are not shown in FIG. 1, in order that the relationship between the openings be more clearly illustrated, and to indicate there are many different kinds of fastener arrangements which could serve the purpose.

The fasteners in FIGS. 2-5 which attach the tray 2 to the legs 40 and 42 are standard bolts 22 fitted with wingnuts 24. By hand-loosening the wingnuts 24, the boater can easily lift the tray off its legs.

A bolt 26 and wingnut 28 arrangement (FIG. 4) is also indicated in the drawings to attach the cutting board 16 to the tray bottom 12, although again a variety of fasteners could be used. The advantage of the illustrated arrangement is that the fish-tray user can easily reposition the cutting board 16. In practical use the board 16 is often used not only to cut down on, but also to wedge the slippery fish against, as a support, while scaling or filleting. The two uses often require different cutting board 16 positions.

Figure 5:
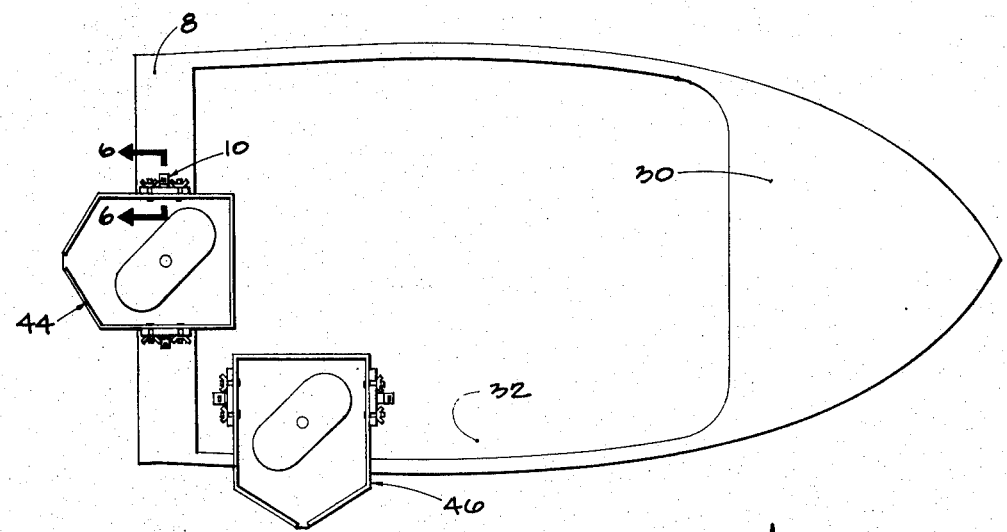
FIG. 5 is a top view of a boat showing two of any number of possible mounting positions of the tray on a boat.
Figure 6:
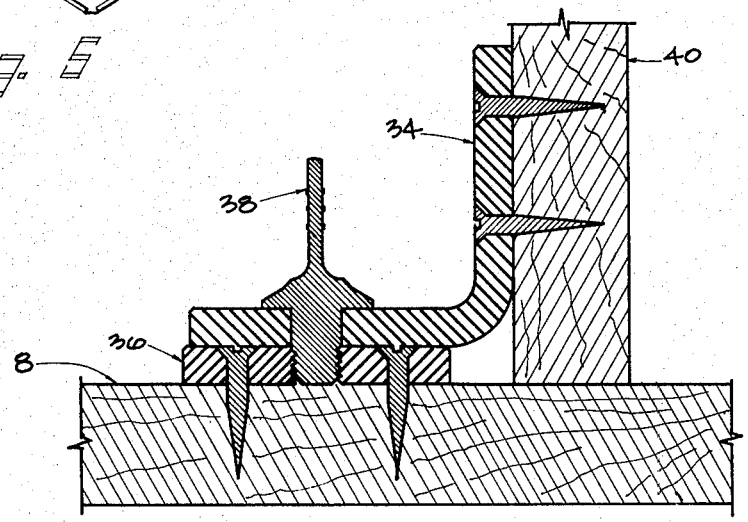
FIG. 6 is a view in vertical section of a fitting which can attach the legs of the tray to a boat surface, taken along line 6—6 of FIG. 5.

FIG. 5 shows a boat 30 which diagrammatically represents any type of boat on which fishing could take place. There are two trays 44 and 46 on the boat showing that one or more trays may be used on the same boat and further showing that the trays may be installed any place where the end of the tray with the drainage opening 14 will be suspended over the water. In FIG. 5, the legs of one of the trays 44 are attached to the afterdeck 8 of the boat 30, although the legs could be similarly attached to a gunwale or other surface. The second tray 46 is attached to one such other surface, the floor of the boat's cockpit 32. The means for attachment (i.e., the fittings 10 illustrated in section in FIG. 6) would be the same for both installations in FIG. 5. The installation of the tray 46 on the cockpit 32 floor would simply require longer legs to reach the same height as the other installation. The ideal height and placement would vary with the preference of the user. Some fish cleaners would prefer to sit under the tray, while others would prefer to stand behind the tray.

The means illustrated for attaching the legs 40 and 42 to the boat surface 8 in FIGS. 1-6 is a thumbscrew fitting 10 comprising (FIG. 6) an L-shaped piece 34 which is attached to the leg 40, a baseplate 36 which is attached to the boat surface 8, and a thumbscrew 38 which fits through a hole in the L-shaped piece 34 and screws into a threaded hole in the baseplate 36. This arrangement allows for the legs to be easily detached from the boat surface, leaving only the relatively small, flat baseplate. This is an advantage because a more obtrusive piece of hardware than the baseplate could trouble boaters, who often sit or walk on the surfaces of the boat (afterdeck, gunwales, cockpit floor) where the baseplates must be installed.

While a single specific embodiment of the tray has been shown and described, it is to be understood that other forms may fall within the scope of the appended claims.

What is claimed is:

1. A boat-mountable fish-cleaning tray comprising, in combination, a bottom, upstanding sides connected to the edges of said bottom, and a drainage opening in the tray, at least one point on the perimeter of which opening being located on or adjacent to said tray bottom; a cutting board attached to said tray bottom; and a means for attaching the tray to a boat so that when attached the lowest points on the tray are adjacent to the aforementioned opening and so the part of the tray with said opening is suspended out away from the boat and over the water, said means for attaching the tray to a boat consisting of a plurality of legs which at their tops are slotted and connected to the tray by means of hand-tightenable and -loosenable fasteners which fit through the aforementioned slots, and which said legs at their bottoms can be cut to length to hold the tray at the proper working height and position and shaped to fit the contour of the boat at which points they are attached thereto, said legs being attachable to a boat by means of fittings, each comprising an L-shaped piece which is attached to the leg, a flat baseplate which is attached to the boat, and a hand-tightenable and -loosenable fastener which fits through a hole in the L-shape piece and screws into the baseplate.

2. The combination defined in claim 1 wherein said cutting board can be rotated about an axis, the fastener attaching the board to the tray serving as said axis.

* * * * *